United States Patent [19]

Yamaguchi et al.

[11] Patent Number: 5,016,212
[45] Date of Patent: May 14, 1991

[54] IC CARD HAVING SYSTEM ROM SELECTION INHIBIT

[75] Inventors: Atsuo Yamaguchi; Shigeru Furuta; Takesi Inoue; Kenichi Takahira; Shuzo Fujioka; Toshiyuki Matsubara, all of Itami, Japan

[73] Assignee: Mitsubishi Denki Kabushiki Kaisha, Japan

[21] Appl. No.: 278,451

[22] Filed: Dec. 1, 1988

[30] Foreign Application Priority Data

Jun. 30, 1988 [JP] Japan .................. 63-160742

[51] Int. Cl.⁵ .................. G06F 12/06; G06F 11/28
[52] U.S. Cl. .................. 364/900; 364/921.8; 364/938; 364/928.3; 364/928.4; 364/927.8; 364/926.1; 364/926.3; 364/964; 364/944.6; 364/954; 364/954.2; 364/468; 364/944.92; 364/965.5; 364/969; 364/243; 364/234.3; 364/234; 364/244.6; 364/221.7; 364/221; 364/238.4

[58] Field of Search ... 364/200 MS File, 900 MS File; 371/16.1, ; 235/379, 380, 492

[56] References Cited

U.S. PATENT DOCUMENTS

| | | | |
|---|---|---|---|
| 4,127,768 | 11/1978 | Negi | 371/16.1 |
| 4,339,801 | 7/1982 | Hosaka | 371/16.1 |
| 4,347,608 | 8/1982 | Appiano | 371/16.1 |
| 4,433,413 | 2/1984 | Fasang | 364/900 |
| 4,481,627 | 11/1984 | Beauchesne | 371/21.1 |
| 4,577,273 | 3/1986 | Hopper | 364/200 |
| 4,633,466 | 12/1986 | Laws | 371/16.1 |
| 4,646,298 | 2/1987 | Laws | 371/16 |
| 4,650,975 | 3/1987 | Kitchner | 235/375 |
| 4,672,534 | 6/1987 | Kamiya | 364/200 |
| 4,703,446 | 10/1987 | Momose | 371/16.1 |
| 4,709,137 | 11/1987 | Yoshida | 235/379 |
| 4,726,024 | 2/1988 | Guziak | 371/16.1 |
| 4,748,320 | 5/1988 | Yorimoto | 235/492 |
| 4,755,660 | 7/1988 | Nakano | 235/380 |
| 4,760,575 | 7/1988 | Watanabe | 371/21.2 |
| 4,768,162 | 8/1988 | Nishimura | 364/900 |
| 4,777,355 | 10/1988 | Takahira | 235/380 |
| 4,777,355 | 10/1988 | Takahiro | 235/380 |
| 4,797,885 | 1/1989 | Orimo | 371/19 |
| 4,804,825 | 2/1989 | Bitoh | 235/380 |
| 4,816,656 | 3/1989 | Nakano | 235/380 |
| 4,829,169 | 5/1989 | Watanabe | 235/492 |
| 4,839,506 | 6/1989 | Homma | 235/379 |
| 4,839,895 | 6/1989 | Makita | 371/16.1 |
| 4,853,850 | 8/1989 | Krass | 364/200 |

Primary Examiner—Archie E. Williams, Jr.
Assistant Examiner—Eric Coleman
Attorney, Agent, or Firm—Leydig, Voit & Mayer

[57] ABSTRACT

An IC card has a CPU, a first memory for storing a test program, a second memory for storing an application progam, a bus connecting the CPU and the first and second memories. A detection circuit for detecting whether the CPU has began executing the application program stored in the second memory, and a disconnection circuit for disconnecting the first memory from the bus when the detection circuit detects that the CPU has begun executing the application program. The above-described arrangement makes it impossible to access the test program in the system ROM from the application program thereby preventing the occurrence of incorrect access.

3 Claims, 8 Drawing Sheets

IC CARD HAVING SYSTEM ROM SELECTION INHIBIT

BACKGROUND OF THE INVENTION

1. Field of the Invention

The present invention relates generally to IC cards and, more particularly, to an IC card which stores both a test program for performing a test on the IC card itself (a product test) and an application program for performing various functions required for the use of the IC card.

2. Description of the Related Art

Figure 6:
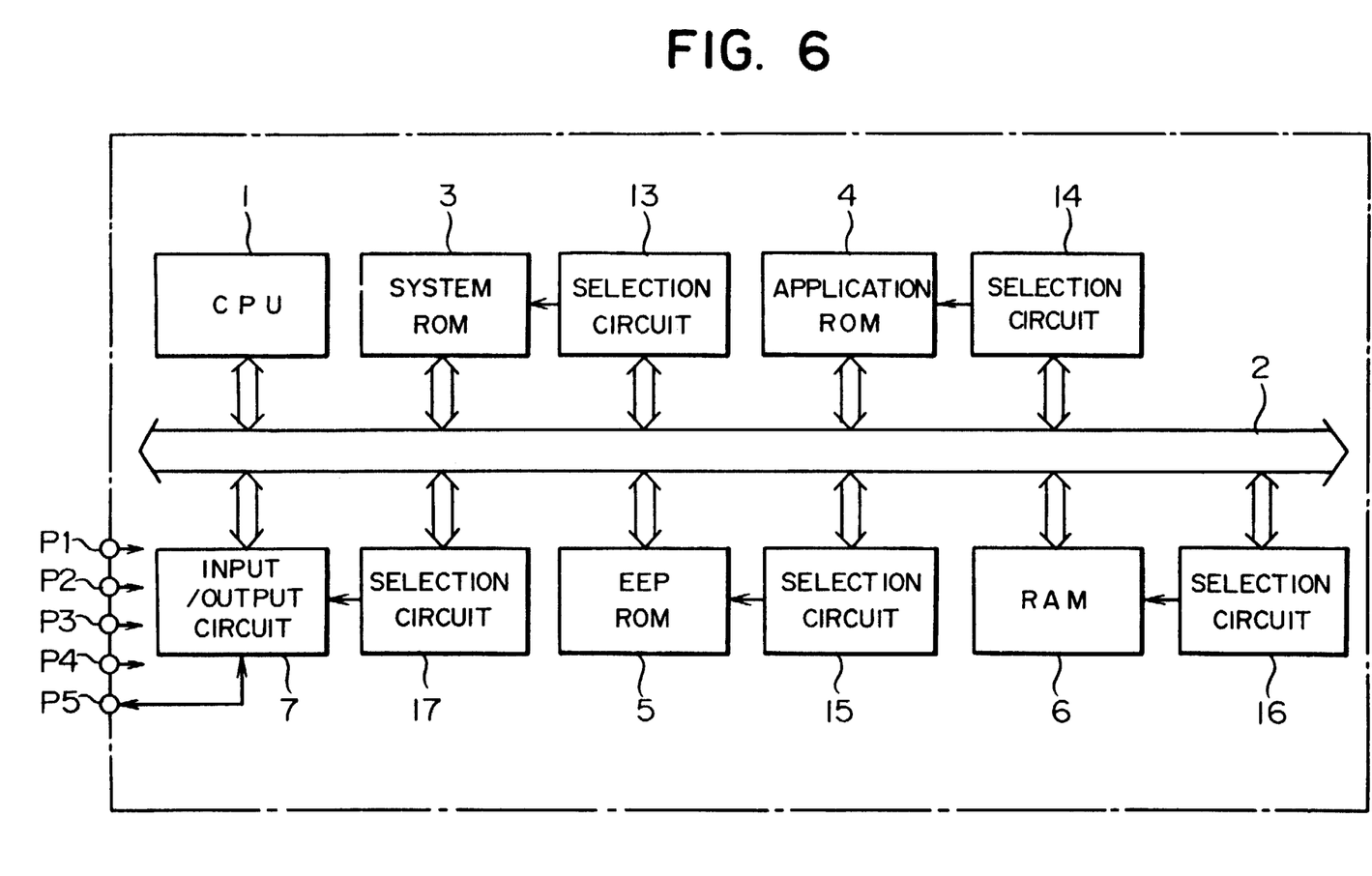
FIG. 6 is a block diagram showing the construction of a conventional type of IC card.

FIG. 6 is a block diagram showing the construction of a conventional type of IC card. As illustrated, a CPU 1 is connected to both a system ROM 3 and an application ROM 4 through a bus 2.

Figure 7:
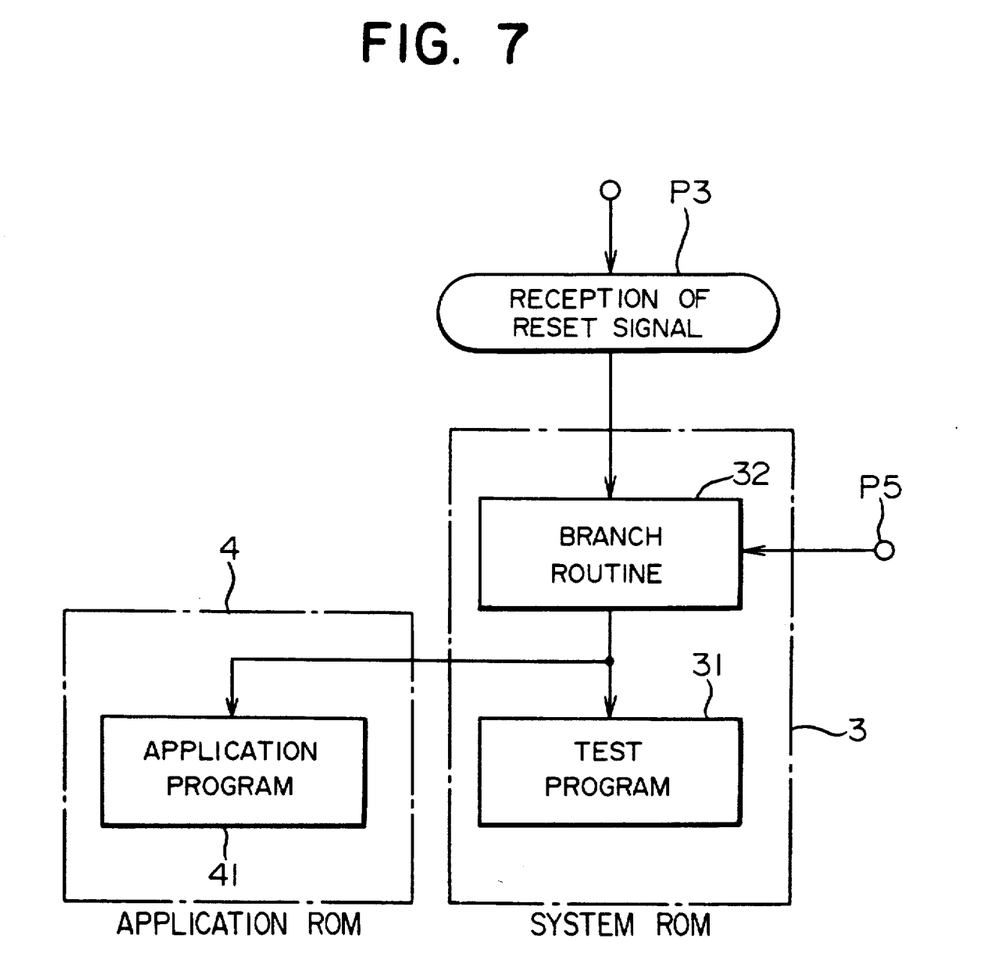
FIG. 7 is a schematic block diagram which serves to illustrate the construction of the system ROM and of the application ROM.

As shown in FIG. 7, the system ROM 3 stores a test program 31 for performing a test on the IC card itself, and the application ROM 4 stores an application program 41 for performing various functions which are required for the use of the IC card. The system ROM 3 further stores a branch routine 32 first for determining whether the test program 31 or the application program 41 should be executed and then for branching to the program to be executed.

Referring back to FIG. 6, an EEPROM 5 for storing variable data, a RAM 6 for temporarily storing data, and an input/output circuit 7 for effecting data communication with external equipment are connected to the bus 2.

Figure 8:
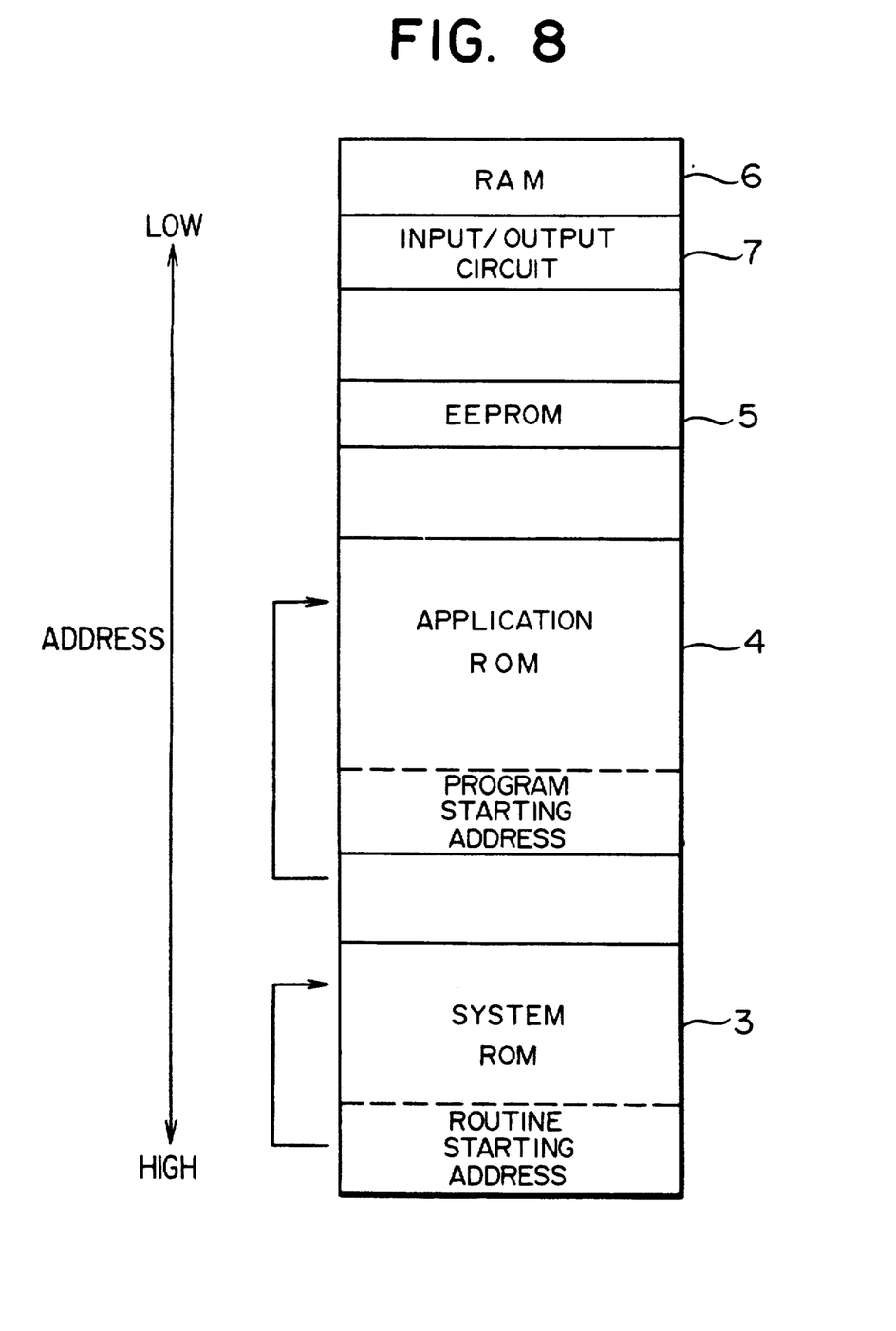
FIG. 8 is a diagram showing a memory arrangement in the conventional type of IC card.

As shown in FIG. 8, the system ROM 3, the application ROM 4, the EEPROM 5, the RAM 6 and the input/output circuit 7 are arranged in various address ranges of a memory space. It is therefore possible to easily access a desired area of the respective memories with the same type of instruction.

Also, the system ROM 3, the application ROM 4, the EEPROM 5, the RAM 6 and the input/output circuit 7 are respectively connected to selection circuits 13, 14, 15, 16 and 17 to select the corresponding ones of these memories and the input/output circuit 7 on the basis of the arrangement of the memory space shown in FIG. 8 in accordance with the state of the bus 2.

In FIG. 6, a terminal P1 is a positive power input terminal; P2 is a grounding terminal for a power source; P3 is a reset signal terminal for receiving as its input a reset signal that initializes the CPU 1; P4 is a clock terminal for receiving a clock signal as its input; and P5 is an I/O terminal.

Such an IC card operates in the following manner. When a reset signal is input to the IC card through the reset signal terminal P3, the CPU 1 reads out a routine starting address at which execution of the branch routine 32 is initiated, the routine starting address being stored in advance in the system ROM 3 at a predetermined address thereof. The CPU 1 initiates the execution of the branch routine 32 at this routine starting address. If an instruction for executing the test program 31 is input from external equipment (not shown) through the I/O terminal P5 during the execution of the branch routine 32, the CPU 1 causes the process to proceed from the branch routine 32 to the ensuing test program 31. The test program 31 accesses an arbitrary address to enable a satisfactory product test. The CPU 1 accesses individual addresses in accordance with the test program 31, thereby performing a product test.

On the other hand, if no instruction for executing the test program 31 is input, the CPU 1 reads out a program starting address at which execution of the application program 41 is initiated, the program starting address being stored in advance in the application ROM 4 at a predetermined address thereof. The CPU 1 initiates the execution of the application program 41 at this program starting address.

However, since the system ROM 3 and the application ROM 4 are arranged in a memory space as described previously, when the IC card is being used in its normal memory arrangement, that is, during the execution of the application program 41, the CPU 1 may read out the test program 31 to find a procedure for entering the test program 31. This results in the problem that the CPU 1 may access an arbitrary address by using a function provided in the test program 31, thus providing incorrect access.

SUMMARY OF THE INVENTION

It is, therefore, an object of the present invention to provide an IC card which can prevent the occurrence of incorrect access to achieve positive operation.

To achieve the above and other objects, in accordance with the present invention, there is provided an IC card comprising a CPU; a first memory for storing a test program; a second memory for storing an application program; a bus connecting the CPU and the first and second memories; detection means for detecting whether the CPU has begun executing the application program; and disconnection means for disconnecting the first memory from the bus when the detection means detects that the CPU has begun executing the application program.

In the present invention, when the detection means detects the fact that the CPU has executed the application program in the second memory, the disconnection means cuts off the connection between the bus and the first memory in which the test program is stored.

The above and other objects, features and advantages of the present invention will become apparent from the following description of the preferred embodiments thereof, taken in conjunction with the accompanying drawings.

DESCRIPTION OF THE PREFERRED EMBODIMENTS

The preferred embodiments of the present invention will be described below with reference to the accompanying drawings wherein the same constituent elements are indicated by like reference numerals.

Figure 1:
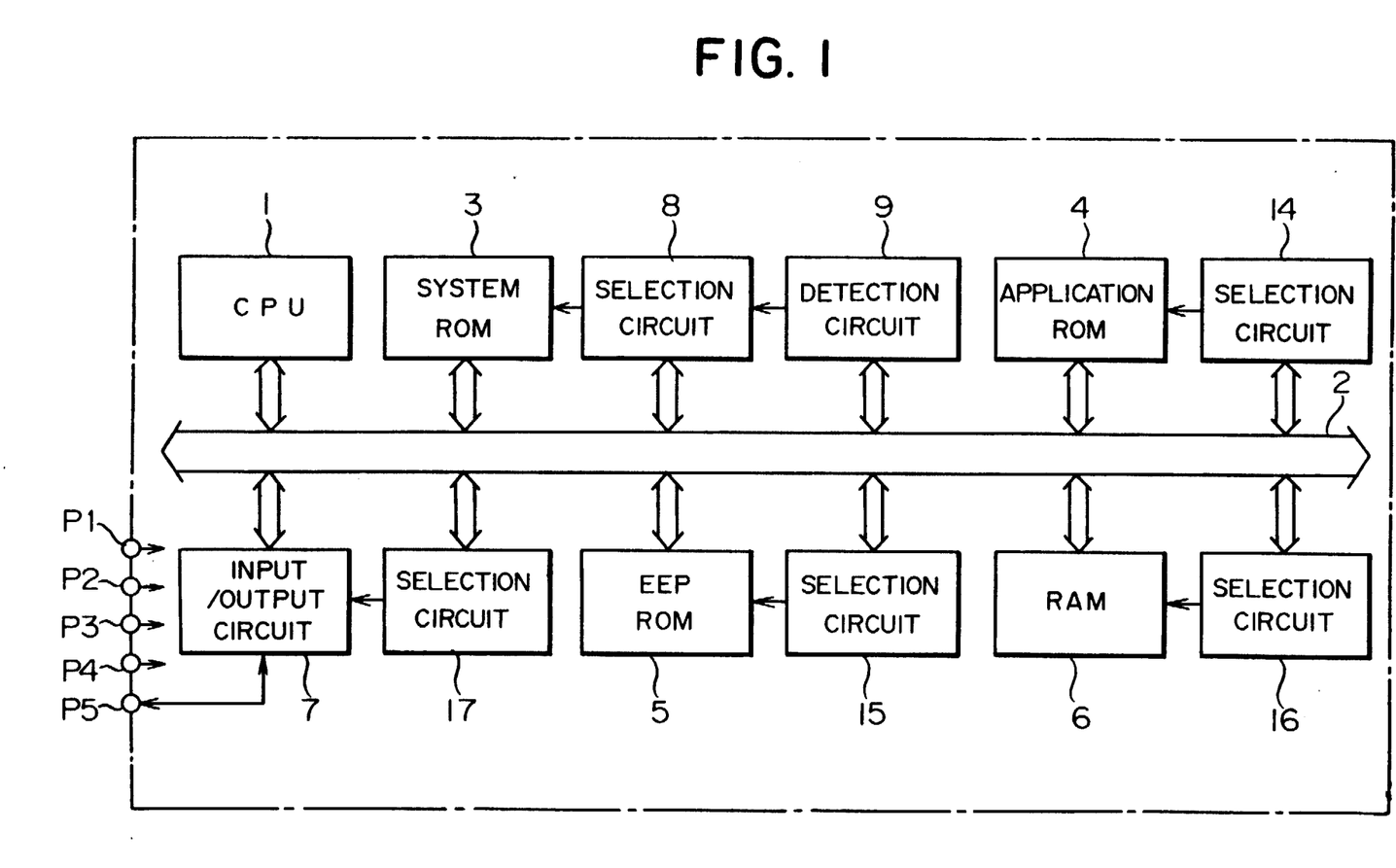
FIG. 1 is a block diagram showing the construction of an IC card according to a first embodiment of the present invention.

FIG. 1 is a block diagram showing the construction of an IC card according to a first embodiment of the present invention. The illustrated IC card includes a CPU 1, and a system ROM 3 as a first memory and an application ROM 4 as a second memory are connected to the CPU 1 through a bus 2. Furthermore, an EEPROM 5 for storing variable data, a RAM 6 for temporarily storing data and an input/output circuit 7 for data communication with external equipment (not shown) are connected to the bus 2.

The system ROM 3 stores a test program for performing a test on the IC card itself, and the application ROM 4 stores an application program for performing various functions which are required for the use of the IC card. The system ROM 3 further stores a branch routine for first determining whether the test program or the application program should be executed and then branching to the program to be executed.

Selection circuits 14, 15, 16 and 17 are connected to the application ROM 4, the EEPROM 5, the RAM 6 and the input/output circuit 7, respectively. The selection circuits 14, 15, 16 and 17 select the corresponding memories 4, 5 and 6 or the input/output circuit 7 according to the state of the bus 2.

A selection circuit 8 as a disconnection means is connected to the system ROM 3, and a detection circuit 9 which serves as a detection means is connected to the selection circuit 8. When the detection circuit 9 detects through the bus 2 that the CPU 1 has read out the program starting address of the application program in the application ROM 4, the detection circuit 9 outputs a system ROM selection inhibit signal to the selection circuit 8. Like the other selection circuits 14 to 17, the selection circuit 8 selects the system ROM 3 on the basis of the state of bus 2 to enable data communication with the bus 2. When the system ROM selection inhibit signal is input from the detection circuit 9 to the selection circuit 8, the selection circuit 8 is inhibited from selecting the system ROM 3 irrespective of the state of the bus 2 and substantially cuts off the connection between the system ROM 3 and the bus 2.

Like the conventional example shown in FIG. 6, the present IC card is also provided with the positive power input terminal P1, the power source grounding terminal P2, the reset signal terminal P3, the clock terminal P4, and the I/O terminal P5.

The operation of the first embodiment will be described below.

When a reset signal is applied to the input of the reset signal terminal P3, the CPU 1 reads out the routine starting address of the branch routine which is stored at a predetermined address in the system ROM 3, and initiates the execution of the branch routine at the routine starting address.

In the branch routine, the state of the I/O terminal P5 is first checked to determine the presence or absence of an instruction for executing a product test. If the instruction for executing the product test is detected, the test program is executed subsequently to the branch routine. This test program accesses an arbitrary address in order to perform a satisfactory product test. The CPU 1 accesses individual addresses in accordance with the test program and performs the product test.

Figure 2A:
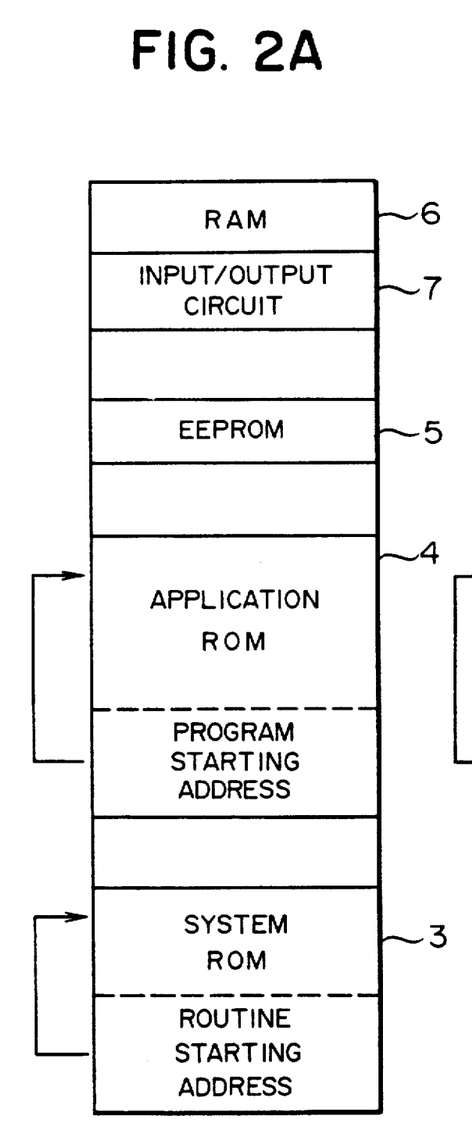
FIG. 2A is a diagram showing a normal memory arrangement according to the first embodiment.

During this time, the system ROM 3, the application ROM 4, the EEPROM 5, the RAM 6, and the input/output circuit 7 are connected to the bus 2 and are arranged in various address ranges of a memory space as shown in FIG. 2A. The memories 3, 4, 5, 6, and the input/output circuit 7 are selected by the corresponding selection circuits 8, 14, 15, 16, and 17 on the basis of the state of the bus 2.

Figure 2B:
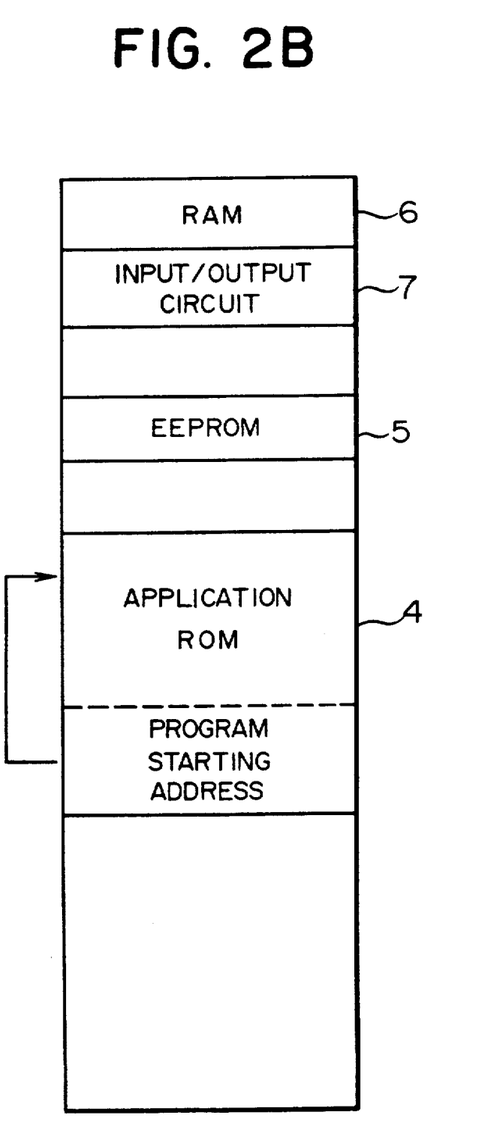
FIG. 2B is a diagram showing a memory arrangement for the execution of an application program according to the first embodiment.

On the other hand, if the instruction for executing the product test is not input, the CPU 1 reads out the program starting address of the application program which is stored at a predetermined address in the application ROM 4 in order to cause the process to proceed from the branch routine to the application program in the application ROM 4. At this time, the detection circuit 9 detects that CPU 1 has read out the program starting address of the application program, so that the system ROM selection inhibit signal is output from the detection circuit 9 to the selection circuit 8. Thus, the selection circuit 8 is inhibited from selecting the system ROM 3 irrespective of the state of the bus 2. In other words, the connection between the system ROM 3 and the bus 2 is disconnected, i.e., substantially cut off, and, as shown in FIG. 2B, the system ROM 3 is excluded from the memory space.

In such a state, the CPU 1 executes the application program. Accordingly, it becomes impossible to access the test program from the application program in the system ROM 3, whereby incorrect access is prevented.

Figure 3:
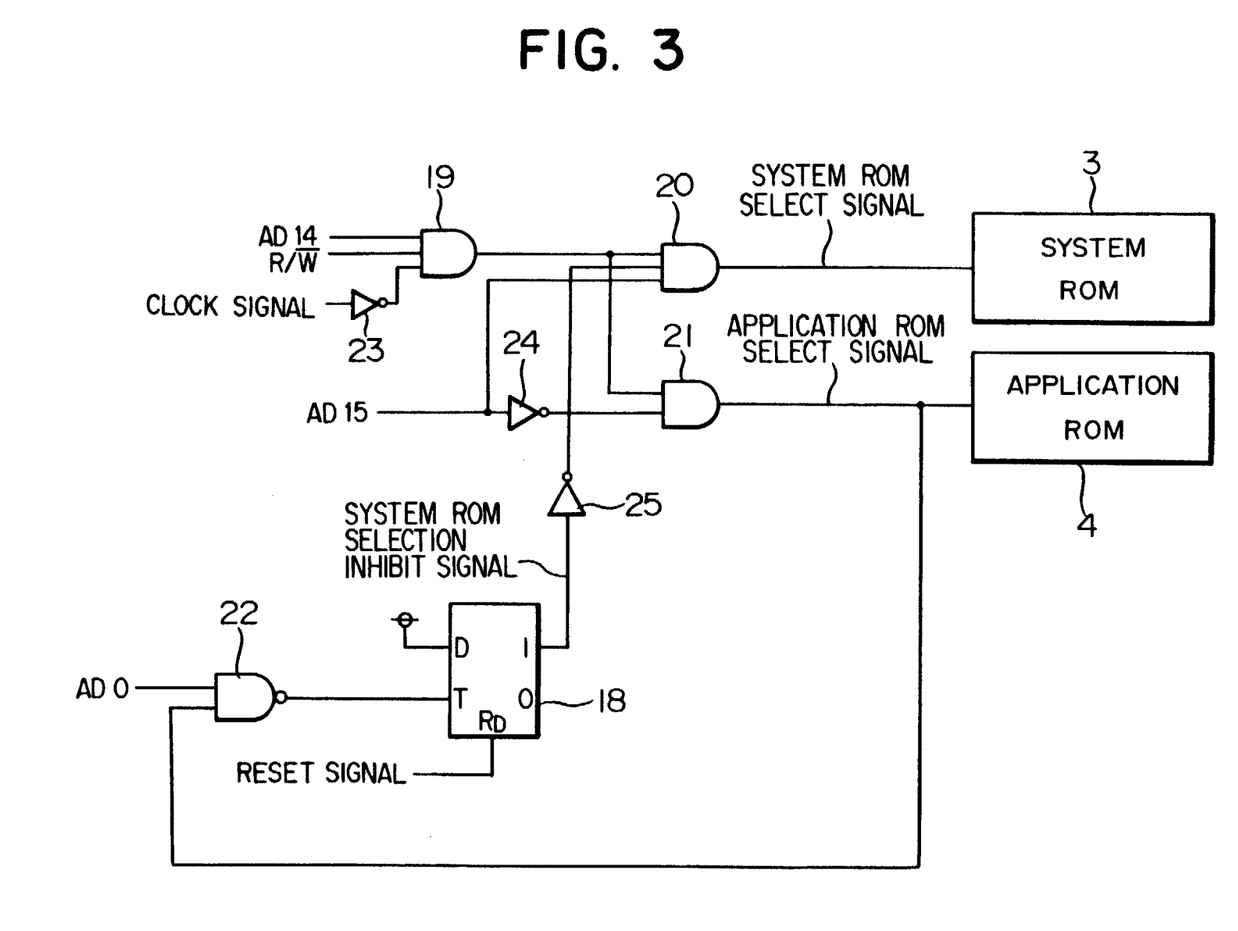
FIG. 3 is a circuit diagram showing the essential portion of a second embodiment.

FIG. 3 is a circuit diagram showing the concrete construction of the detection circuit 9 and the selection circuits 8 and 14 associated with the system ROM 3 and the application ROM 4, respectively. The illustrated circuit includes a flip-flop circuit 18, address code AND circuits 19 to 21, a NAND circuit 22, and inverter circuits 23 to 25. The circuit of FIG. 3 provides control over the selection between the system ROM 3 and the application ROM 4 according to a specified address in the memory space having addresses of four-digit hexidecimal numbers (of 16-bit construction).

Figure 4A:
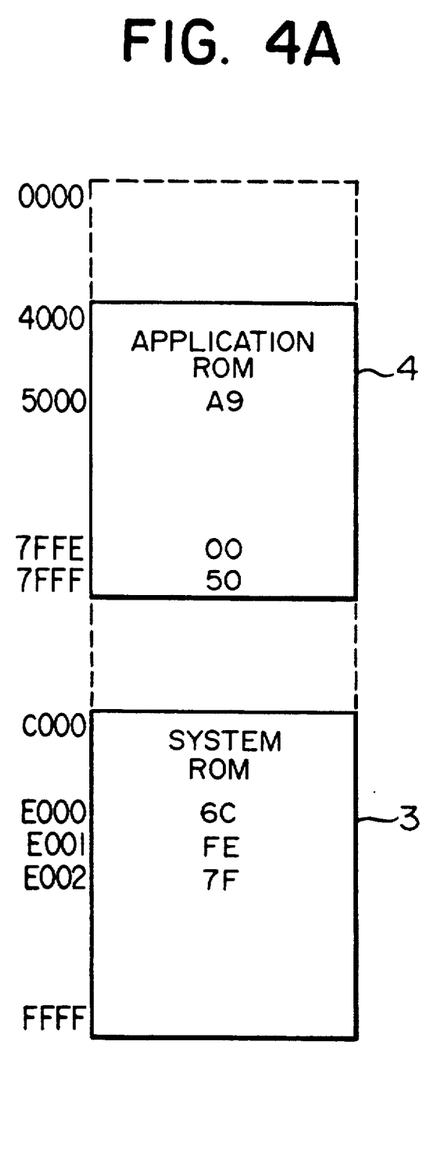
FIG. 4A is a diagram showing a normal memory arrangement according to the second embodiment.

FIG. 4A shows a memory arrangement which is normally selected. In the normal memory arrangement, the application ROM 4 is arranged in an area defined by addresses 4000 to 7FFF and the system ROM 3 is arranged in an area defined by addresses C000 to FFFF. The program starting address of the application program in the application ROM 4 is 5000, and an initial instruction A9 in the application program is stored at address 5000. Also, the program starting address 5000 is stored at addresses 7FFE and 7FFF in the application ROM 4. Of these addresses at which is stored the program starting address 5000 of the application program, the lower address 7FFE is stored at addresses E001 and E002 in the system ROM 3. A jump instruction 6C stored at address E000 which is contiguous to the address E001 in the downward direction enables the process to jump to the program stored in addresses 7FFE and 7FFF starting address 5000 of the application program.

Figure 5:
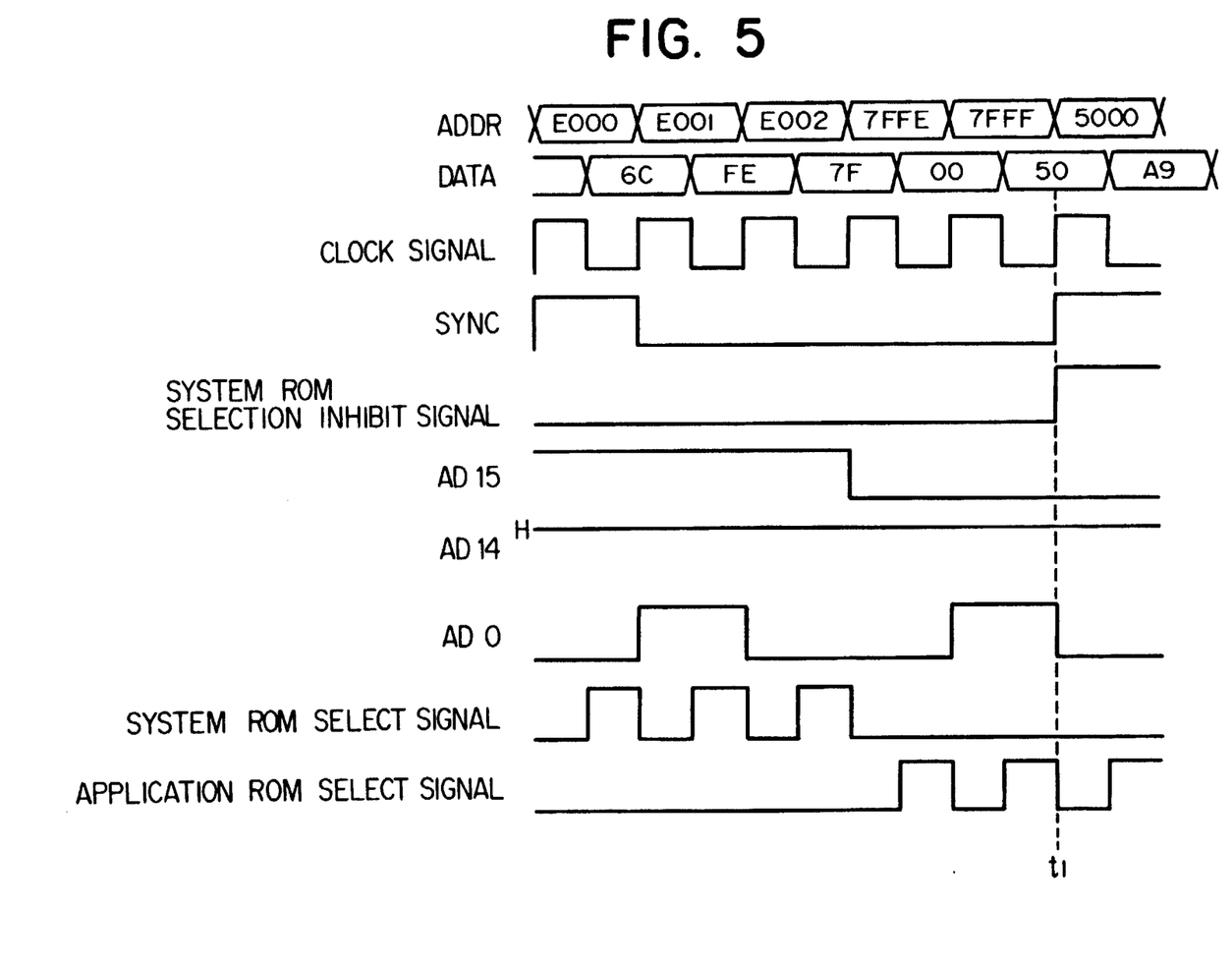
FIG. 5 is a timing chart showing the operation of the second embodiment.

The operation of the circuit shown in FIG. 3 will be described below with reference to the timing chart of FIG. 5.

When the power source is switched on and a reset signal is input to the terminal $R_D$ of the flip-flop circuit 18, the flip-flop circuit 18 is reset and the system ROM selection inhibit signal goes to a low level. Therefore, a high-level signal is output from the inverter circuit 25 to the AND circuit 20. Thus, the memory arrangement such as that shown in FIG. 4A is formed.

If an arbitrary address is specified from among addresses C000 to FFFF which define the area of the system ROM 3, a high-level system ROM select signal is input to the system ROM 3 through the AND circuits 19 and 20 since the two high-order bits AD14 and AD15 of each 16-bit address which contains AD0 (the lowest order bit) to AD15 (the highest order bit) are necessarily at the high levels. Thus, the system ROM 3 is selected.

On the other hand, if an arbitrary address from addresses 4000 to 7FFF which defines the area of the application ROM 4 is specified, a high-level application ROM select signal is input to the application ROM 4 through the AND circuits 19, 21 and the inverter circuit 24 since the two high order bits AD14 and AD15 of each address in this area are necessarily at the high level and the low level, respectively. Thus, the application ROM 4 is selected.

In the branch routine stored in the system ROM 3, branching to the application program in the application ROM 4 is effected as follows. First, the jump instruction 6C at address E000 is read, then address 7FFE stored at addresses E001 and E002 is read in accordance with the instruction 6C, and then program starting address 5000 of the application program which is stored at address 7FFE and the following address 7FFF is read out.

At time $t_1$ at which the program starting address 5000 of the application ROM 4 which is stored in the area of the application ROM 4 is read, a low-level signal is, as shown in FIG. 3, input from the NAND circuit 22 to the flip-flop circuit 18 since both the high-level application ROM select signal is input to the application ROM 4 and the lowest order bit AD0 that designates address 5000 is at the high level. Thus, the system ROM selection inhibit signal output from the flip-flop circuit 18 is inverted to a high level, and subsequently the system ROM selection inhibit signal is maintained at the high level until a reset signal is again input to the flip-flop circuit 18. Accordingly, the low-level signal is input through the inverter circuit 25 to the AND circuit 20 connected to the system ROM 3, and the system ROM select signal is maintained at the low level irrespective of the state of the bus 2, particularly the levels of the bits AD14 and AD15, whereby it becomes impossible to select the system ROM 3.

Figure 4B:
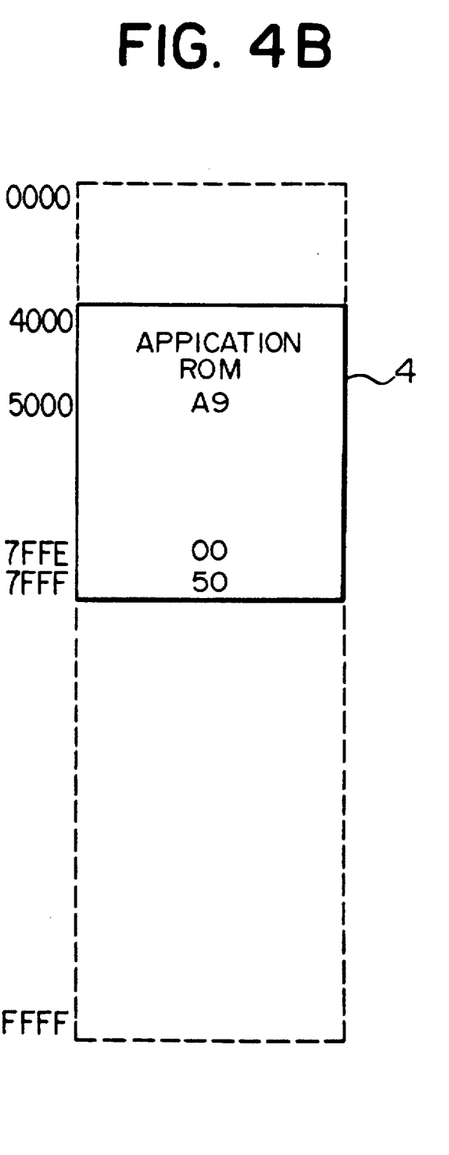
FIG. 4B is a diagram showing a memory arrangement for the execution of an application program according to the second embodiment.

In other words, the connection between the system ROM 3 and the bus 2 is cut off so that the memory arrangement which excludes the system ROM 3 as shown in FIG. 4B is formed.

It is to be noted that the first and second embodiments shown in FIGS. 1 to 5 are intended for the purpose of illustration only, and the present invention is not limited to such embodiments.

What is claimed:
1. An IC card comprising:
a CPU;
an input/output (I/O) terminal;
a first memory for storing a test program and a branch routine, the branch routine being executed following a system reset and monitoring said I/O terminal for instructions received from outside said IC card, wherein if an instruction for executing the test program is received at said I/O terminal, the branch routine proceeds to the test program;
a second memory including a plurality of contiguous memory addresses for storing an application program, the application program including a first instruction, the plurality of addresses including a starting address at which the first instruction of the application program is stored, said second memory further storing the starting address of the application program at a predetermined address, wherein the branch routine includes instructions for directing said CPU to read the contents of the predetermined address and to jump to the application program at the starting address indicated by the contents of the predetermined address if no instruction for executing the test program is received at said I/O terminal;
a bus connecting said CPU, said first and second memories, and said I/O terminal;
detection means for detecting that said CPU has read the starting address of the application program from the predetermined address, thereby detecting that said CPU has begun executing the application program stored in said second memory; and
disconnection means for disconnecting said first memory from said bus when said detection means detects that said CPU has read the starting address of the application program from the predetermined address.

2. An IC card according to claim 1 wherein said disconnection means includes means for inhibiting selection of said first memory irrespective of the state of said bus.

3. An IC card according to claim 1 wherein said disconnection means includes:
a first address decode logic gate connected to output an application ROM select signal to said second memory;
a flip-flop having an input connected to receive the application ROM select signal and an output for carrying a system ROM selection inhibit signal; and
a second address decode logic gate connected to receive the system ROM selection inhibit signal and to output a system ROM select signal to said first memory, said second address decode logic gate producing an inactive system ROM selection signal when the system ROM selection inhibit signal is output from said flip-flop.

* * * * *